Nov. 13, 1923.
E. S. PAYMENT
THERMOMETER
Filed May 19, 1919
1,474,001
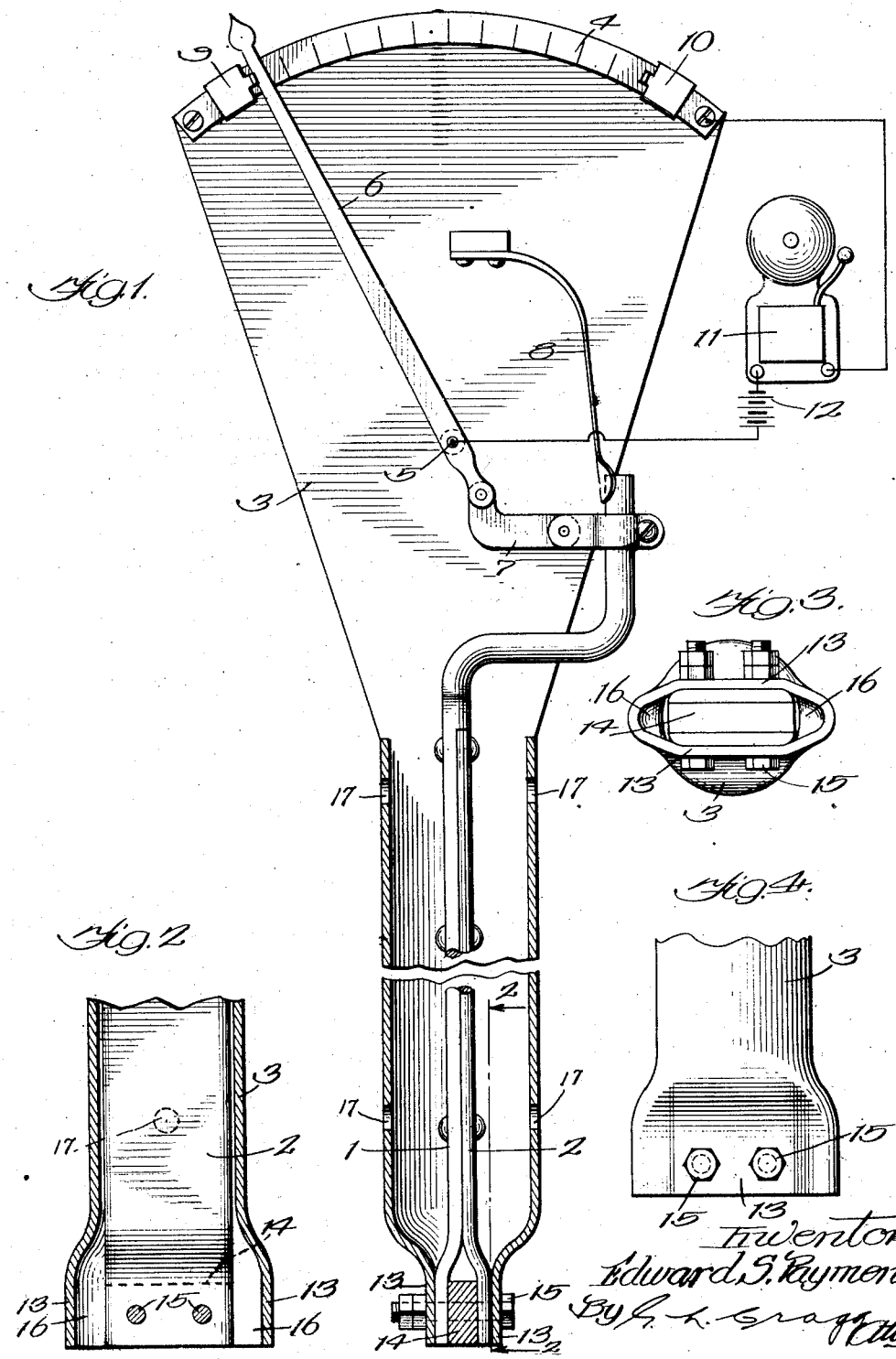

Patented Nov. 13, 1923.

1,474,001

UNITED STATES PATENT OFFICE.

EDWARD S. PAYMENT, OF CHICAGO, ILLINOIS.

THERMOMETER.

Application filed May 19, 1919. Serial No. 297,999.

*To all whom it may concern:*

Be it known that I, EDWARD S. PAYMENT, a citizen of the United States, residing at Chicago, in the county of Cook and State of Illinois, have invented a certain new and useful Improvement in Thermometers, of which the following is a full, clear, concise, and exact description.

My invention relates to thermometers employed for measuring the temperature of liquids and has for its object the provision of a housing for such a thermometer which permits of access of the liquid thereto yet which guards against the breakage thereof. The device of my invention includes a tube enclosing the thermometer and open for the passage thereinto and therefrom of liquid whose temperature is to be measured.

I will explain my invention more fully by reference to the accompanying drawing in which Fig. 1 is a front view, partially in section, of a thermometer made in accordance with the preferred embodiment of the invention; Fig. 2 is a sectional view on line 2—2 of Fig. 1; Fig. 3 is a bottom view of the lower end of the structure; and Fig. 4 is a side view of the lower end of the structure.

Like parts are indicated by similar characters of reference throughout the different figures.

The operating agency of the thermometer shown is a bimetallic thermostatic element 1, 2 mounted at its lower end upon a support 3, although the invention is not to be limited to a thermometer employing a thermostat. The upper end of said support carries a metallic scale 4 in the form of a segment whose curved edges are concentric with the pivot 5 of the metallic temperature indicating needle 6 whose index end swings over the face of the scale. The needle 6 is continued below its pivot 5 to have pivotal connection with the arm 7 connected with the extended upper end of one of the thermostatic metallic parts 1 which is upwardly extended for the purpose. As the temperature rises the thermostat 1, 2 becomes warped to an extent corresponding to the temperature, the needle 6 being turned a corresponding extent through the lever 7. When the temperature falls the thermostat straightens to an extent corresponding to the reduction in temperature. A spring 8 presses upon the thermostatic part 2 to move the index end of the needle 6 toward the zero end of the scale 4, as the temperature falls, the movement of the index being limited and defined by the thermostat.

Two metallic contacts 9 and 10 are electrically connected with and are adjustable along the metallic scale 4. These three elements 4, 9 and 10 are electrically connected with one terminal of an alarm bell or other indicator 11 whose other end is connected with the metallic indicating needle. A battery 12 is connected in circuit with the indicator 11.

When the temperature reaches a predetermined lower limit, adjustably determined by the left hand contact 9, the indicating needle 6 will engage said contact and cause the signal device 11 to sound by completing circuit therethrough. Similarly, when the temperature reaches a predetermined upper limit, adjustably determined by the right hand contact 10 the indicating needle 6 will engage said contact and cause the signal device 11 to sound.

The contacts 9 and 10 slide along the scale 4 so that after the alarm has been sounded or otherwise manifested and the temperature should either continue to rise or fall, the engaged contact will slide so as not to interfere with the normal operation of the pointer.

The portion of the support 3 that is in the region of both of the thermostatic elements 1 and 2 is tubular and encloses the same. The lower end of the tubular portion of the support 3 is partially collapsed as indicated at 13 to expand laterally of the tube beyond the balance thereof. The thermostatic parts 1 and 2 are spread apart at their bottom ends to receive a block 14 therebetween. Bolts 15 are passed through the collapsed part of the tube, the block and the thermostatic elements to receive these parts in assembly.

By partially collapsing the tube at 13 passages 16 are formed between the thermostat 1, 2 and the tube enclosing it. Other and lateral openings 17 are provided along the housing tube for the entry and discharge of liquid, which is thus permitted to circulate within the instrument in order that the heat thereof may be properly transferred to the thermostat.

When the thermometer is inserted in hot metal tempering oil or other liquid, such oil or liquid will readily flow into the thermostat-protecting tubular housing to reach the thermostat to enable it to operate the temperature indicating needle 6. When the thermometer is lifted out, the hot liquid will readily flow out of the openings in the tube, being finally emptied through the bottom passages 16.

Having thus described my invention I claim as new and desire to secure by Letters Patent, the following:

A thermometer including a temperature indicating pointer; a temperature scale over which the pointer travels; a thermostatic element in actuating relation to said pointer; a tubular housing for and spaced apart from the thermostatic element, this housing being partially collapsed at its lower end and extending at its collapsed portion laterally beyond the balance of the housing, said thermostatic element being in and partially filling the partially collapsed portion of the housing, the upper portion of the housing being perforated to communicate with the space between the thermostatic element and housing.

In witness whereof, I hereunto subscribe my name this 14th day of May, A. D., 1919.

EDWARD S. PAYMENT.